(12) United States Patent
Schwefel

(10) Patent No.: US 9,738,233 B1
(45) Date of Patent: Aug. 22, 2017

(54) VEHICLE WITH BALLET BARRE

(71) Applicant: Aggraziato LLC, Nantucket, MA (US)

(72) Inventor: Christina M. Schwefel, Greenwich, CT (US)

(73) Assignee: Aggraziato LLC, Nantucket, MA (US)

( * ) Notice: Subject to any disclaimer, the term of this patent is extended or adjusted under 35 U.S.C. 154(b) by 0 days.

(21) Appl. No.: 15/286,338

(22) Filed: Oct. 5, 2016

(51) Int. Cl.
*B60R 11/00* (2006.01)
*A63B 1/00* (2006.01)

(52) U.S. Cl.
CPC ............... *B60R 11/00* (2013.01); *A63B 1/00* (2013.01); *A63B 2244/22* (2013.01); *B60R 2011/004* (2013.01); *B60R 2011/0082* (2013.01)

(58) Field of Classification Search
CPC .... A63B 1/00; B60K 11/00; B60K 2011/0029
See application file for complete search history.

(56) References Cited

U.S. PATENT DOCUMENTS 4,976,455 A * 12/1990 Brammer, Sr. ........... B60P 3/36
16/319
5,569,167 A * 10/1996 Friedli ..................... A61H 3/00
482/51
6,193,123 B1 * 2/2001 Adamczewski ......... B60R 9/02
211/41.14

OTHER PUBLICATIONS

Traditional Wood Hinged Wall Mount Ballet Barre System; available at http://www.vitavibe.com/Traditional-Wood-Hinged-Wall-Mount-Ballet-Barre-System_p_26.html, last retrieved on Dec. 7, 2016.

* cited by examiner

*Primary Examiner* — John Walters
*Assistant Examiner* — James Triggs
(74) *Attorney, Agent, or Firm* — Gordon & Jacobson, P.C.

(57) ABSTRACT

A mobile ballet barre apparatus includes a motor vehicle having a driver's seat and a passenger cabin behind the driver's seat, the passenger cabin disposed between opposed elongated sides of the vehicle. The vehicle is configured to travel on ground. The apparatus also includes an elongated ballet barre mounted to a frame of the vehicle on at least one of the elongated sides, each ballet barre extending longitudinally along a longitudinal first axis that is substantially parallel to the side of the vehicle to which it is mounted and substantially parallel to the ground vertically above which it extends in spaced apart relation.

19 Claims, 5 Drawing Sheets

VEHICLE WITH BALLET BARRE

BACKGROUND

1. Field

The present disclosure relates to vehicles fitted with fitness equipment, and more specifically, vehicles fitted with a ballet barre.

2. State of the Art

A ballet barre is a handrail that provides support for people during various types of exercise. Ballet barres are used in dance (e.g., ballet) training, as well as for general exercise and fitness. Use of the ballet barre for dance or general exercise may be referred to as "barre work".

In an indoor dance studio, a ballet barre is typically permanently affixed to a wall of the building. Portable ballet barres exist that consist of a handrail mounted onto a rigid or adjustable, free-standing support frame with legs. Some ballet barres have two parallel handrails at different heights to accommodate people of differing heights. Ballet barre handrails and supports are typically made of metal, wood, plastic, or a combination of these materials.

In ballet, barre work includes both slow and fast exercises, which both serve to strengthen muscles. A ballet barre helps dancers by providing a means of stability and balance and, consequently, barre work often comprises a significant portion of the beginning dancer's class. When used for promoting general fitness, barre exercises may incorporate a wide variety of activities to increase stamina, flexibility, and strength, including ballet movements that require balance and stimulate the core such as plies and pirouettes.

Barre classes have become a popularized form of exercise. A barre class includes the use of the ballet barre as a tool for repetitions of small, pulsing movements with emphasis on form, alignment and core engagement. Devices such as yoga straps, exercise balls, and hand weights are sometimes used during barre classes. Barre classes draw from yoga as well as dance and Pilates and focus on breath and the mind-body connection.

Barre classes may be done outside, such as on sand at beaches. In such outdoor locations, environmental factors such as the loose ground and winds may make it difficult to maintain portable ballet barres upright. Also, shifting ground under a user's feet may cause them to be unstable, and consequently cause instability in the ballet barre when leaning on the ballet barre.

SUMMARY

According to one aspect, further details of which are described below, a mobile ballet barre apparatus includes a motor vehicle having opposed elongate sides with an elongate ballet barre mounted to one of the elongate sides of the vehicle. The ballet barre extends along a horizontal axis parallel to the elongate side of the vehicle to which it is mounted. A pair of ballet barres can be mounted to both elongate sides of the vehicle, if desired.

The apparatus may include a bracket that couples the ballet barre to the elongate side of the vehicle. In one embodiment, the bracket may be configured to position the ballet barre at a fixed distance relative to the ground-engaging plane of the tires of the vehicle. In another embodiment, the bracket can be configured to adjustably pivot the ballet barre between a stowed position and at least one deployed position. The bracket may permit the ballet barre to rotate at least 180 degrees about a fixed pivot axis to allow for variation in height of the ballet barre relative to the ground-engaging plane of the tires of the vehicle as well as for variation in the lateral distance between the ballet barre and the elongate side of the vehicle to which it is mounted. This configuration can allow the ballet barre to be positioned in the deployed position at a height of about 32 to 46 inches+/−5 inches above the ground-engaging plane of the tires of the vehicle. In the stowed position, the ballet barre may be adjacent or near to and parallel to the elongate side of the vehicle to which it is mounted.

The vehicle may have a driver cab forward of a passenger cabin configured to receive one or more passengers, such as for transport in the vehicle to a barre workout location. The ballet barre may extend from a rear end of the vehicle toward a front end of the vehicle. The ballet barre preferably has a length of about 12 feet, but can be shorter or longer in length if desired. The ballet barre can be mounted to an elongate side of the vehicle such that it does not extend beyond the rear end of the vehicle and does not interfere with the operation of a vehicle door leading into the driver cab of the vehicle. A first opening may be defined in a first elongated side of the vehicle that leads into the passenger cabin, and a second opening may be defined in a second elongated side of the vehicle that leads into the passenger cabin. The first and second openings permit visual and audible communication therethrough. Such visual and audible communication may allow ballet barre users to see and hear each other on opposite sides of the vehicle as well as see and hear an instructor who may be located inside the passenger cabin of the vehicle or on either side of the vehicle.

According to another aspect, further details of which are described below, a method of using a mobile ballet barre includes providing the aforementioned mobile ballet barre apparatus and transporting the vehicle to a barre workout location. Transporting may include transporting at least one of a ballet barre user and instructor in the vehicle to the barre workout location. The method may also include, while at the barre workout location, the instructor performing barre work instruction and the user(s) performing barre work using the elongated ballet barre. Where the mobile ballet barre apparatus includes a bracket coupling the ballet barre to the elongated side of the vehicle, the bracket configured to space the ballet barre from the side of the vehicle, and the bracket is pivotable between a stowed position and at least one deployed positions, the transporting may include moving the vehicle with the ballet barre in the stowed position. The method may also include positioning the ballet barre into a deployed position when the vehicle is located at the barre workout location. Further, the method may include opening at least one window in each of the elongated sides of the vehicle when the vehicle is located at the barre workout location. Such opening may permit visual and audible communication therethrough and may allow ballet barre users to see and hear each other on opposite sides of the vehicle as well as see and hear an instructor (and vice versa) who may be located inside the passenger cabin of the vehicle or on either side of the vehicle.

DETAILED DESCRIPTION

Figure 1:
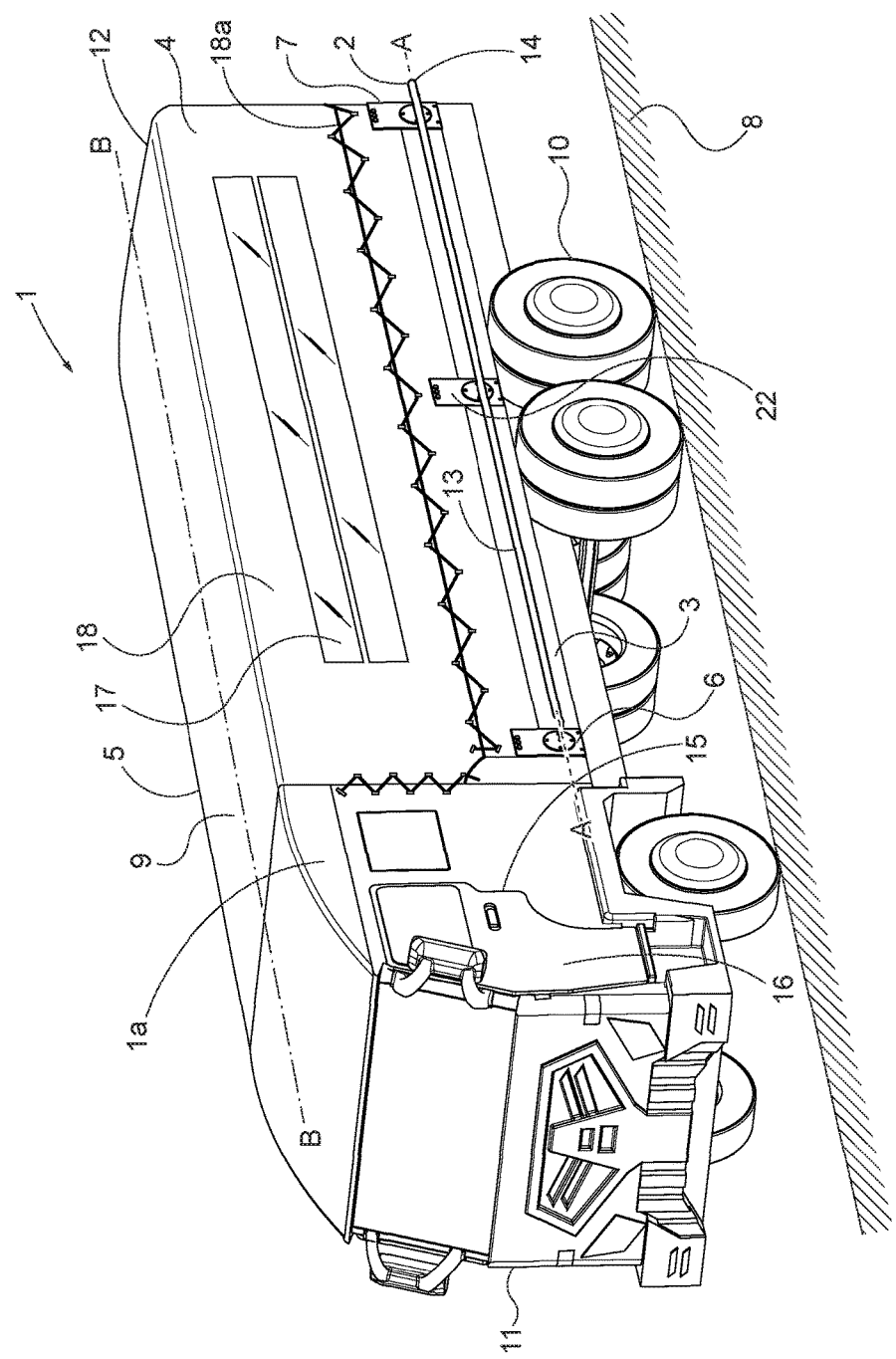
FIG. 1 is an isometric view of an embodiment of a vehicle with a ballet barre mounted thereto in accordance with an aspect of this disclosure.

FIG. 1 shows a road vehicle 1 having an elongated ballet barre 2 mounted to a frame or chassis 3 of the vehicle 1 on a left side 4 thereof. A vehicle frame, also known as its chassis, is the main supporting structure of a motor vehicle to which all other components are attached, comparable to the skeleton of an organism. The frame is distinguished from the vehicle's body, including doors and panels that are attached to the frame. As discussed below, the terms front and rear relate to the front side 11 of the vehicle 1 and rear side 12 of the vehicle 1, respectively. Also, the terms left and right relate to the left side 4 and right side 5 of the vehicle 1, respectively. The vehicle 1 may be a bus or a trolley. Also, the road vehicle 1 may be an off-road motor vehicle, such as a Pinzgauer 712. High-Mobility all-terrain (6x6) vehicle, manufactured by Steyr-Daimler-Puch and BAE Systems Land and Armaments. The Pinzgauer 712 can carry 14 passengers and has sides 4 and 5 that are sufficiently long to mount a 12 foot long ballet barre 2 on each side 4 and 5. For example, the Pinzgauer 712's sides 4 and 5 are about 16 feet long, and each side 4 and 5 can be divided between a driver cab 1a (4.5 feet in length) at the front of the vehicle 1 and a passenger cabin 19 (11.5 feet in length) extending rearwardly from the driver cab 1a to the rear end of the vehicle 1. Another ballet barre (not shown) may be mounted to the frame 3 of the vehicle 1 on an opposite side 5 (i.e., the right side) of the vehicle 1. The following discussion of ballet barre 2 applies equally to such other ballet barre.

The ballet barre 2 is mounted to the frame 3 with a plurality of brackets—a front bracket 6, a rear bracket 7, and an intermediate (i.e., middle) bracket 22 between the front and rear brackets 6 and 7—so that the ballet barre 2 extends substantially parallel to the ground 8 under the vehicle 1 and so that the ballet barre 2 extends at a height that is between a roof 9 of the vehicle 1 and the ground 8. The frame 3 provides sufficient strength to support the brackets 6, 7, and 22 without substantial deformation to the frame 3. The ballet barre 2 may extend at a height of about 30 to 36 inches above the surface of the ground 8. As will be discussed later, it may be advantageous to make the height of the ballet barre 2 adjustable relative to the surface of the ground 8 to account for the bottom of tires 10 sinking in the ground to a ground-engaging plane 8 below the surface of the ground, such as when the vehicle 1 is sitting on loose ground or sand. In the example shown in FIG. 1, the vehicle 1 has six tires 10—three tires on each side 4 and 5 of the vehicle 1. The ground-engaging plane 8 is defined as the common plane in contact with the bottom of each tire 10 and will be a horizontal plane when the vehicle 1 is driven on a flat horizontal solid surface, as shown in FIG. 1. Thus, when the vehicle 1 sits on solid ground, the ground-engaging plane 8 will be substantially co-planar with the surface of the ground.

The brackets 6, 7, and 22 support the ballet barre 2 and space the ballet barre 2 laterally from the frame 3 of the vehicle 1. In one embodiment, the ballet barre 2 is spaced laterally between about 6+/−1 inch from the side of the vehicle.

The ballet barre 2 extends longitudinally along a horizontal axis A-A that is parallel to the frame 3 and offset vertically from the ground-engaging plane 8 of the tires 10 of the vehicle 1. The ballet barre 2 extends from a front end 13 to a rear end 14. The front end 13 of the ballet barre 2 may be located on the cab 1a behind a rear edge 15 of a driver's door 15 of the cab 1a. This permits the driver's door 16 to open and close without interference from the ballet barre 2. In the embodiment shown in FIG. 1, the front end of the ballet barre 2 is spaced longitudinally from the cab 1a at the front bracket 6, although the front end of the ballet barre 2 may extend further forward beyond the front bracket 6 as noted above. Also, the rear end 14 of the ballet barre 2 is shown as being at the rear bracket 7, although the rear end 14 of the ballet barre 2 may be longitudinally spaced from the rear bracket 7. For example, the rear bracket 7 may be mounted slightly forward of the rear end 14 of the ballet barre 2. The brackets 6, 22, and 7 are longitudinally spaced from one another to support the ballet barre 2. While three brackets 6, 22, and 7 are shown in FIG. 1, fewer or more brackets may be used.

Figure 2:
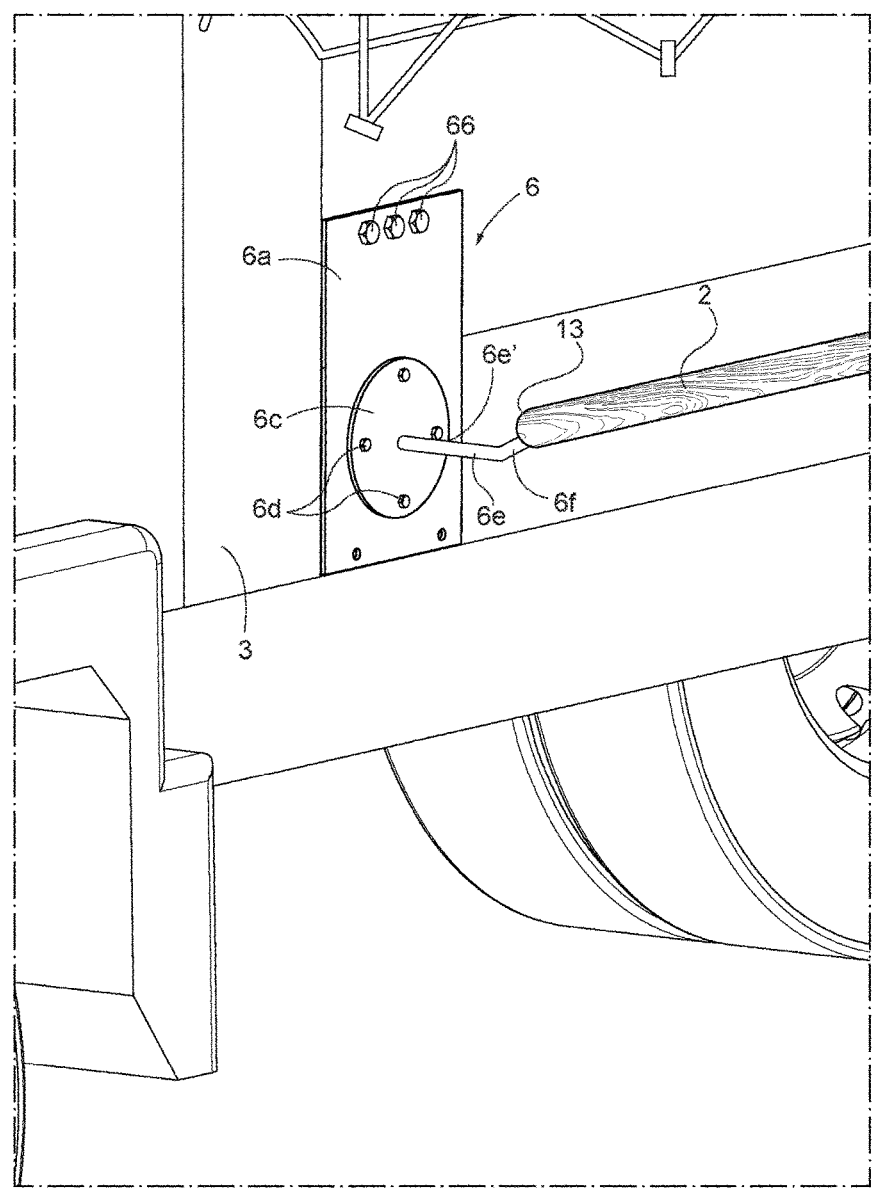
FIG. 2 is an exploded view of a portion of a bracket attached to the vehicle of FIG. 1.

A more detailed view of the front bracket 6 and the front end of the ballet barre 2 is shown in FIG. 2. The ballet barre 2 may be made from wood, such as oak, and may have a diameter of about 1.75 inch to 2 inches and a length of at least 8 feet. Preferably, the length of the barre 2 is at least 12 feet, to accommodate at least 4 people per barre. The longer barre lengths will accommodate more users. While a longer length of the barre 2 preferable, the length may be limited based on the length of the vehicle 1. The front, rear, and intermediate brackets 6, 7, and 22 are identical. The front bracket 6 includes a rectangular plate 6a that is mounted to the frame 3 with fasteners 6b, such as bolts, although other connection means may be used, such as welding. The front bracket 6 also includes a circular plate 6c that is coupled to the plate 6a below the fasteners 6b and the frame 3. The circular plate 6c is shown coupled to the plate 6a with fasteners 6d, such as bolts, although other connection means may be used, such as welding. The front bracket 6 also includes a support arm 6e that extends laterally and vertically with respect to the circular plate 6c. Specifically, the support arm 6e has a generally horizontal proximal portion 6e' and an angled distal portion 6e". The terms proximal and distal here refer to horizontal distance from axis B-B. The horizontal portion 6e' extends from the circular plate 6c to the angled portion 6e" and the angled portion 6e" extends from the horizontal portion 6e' to the ballet barre 2. The angled portion 6e" extends (upwardly and distally) at an angle with respect to the horizontal portion 6e'. Although not shown in FIG. 2, on an inner side of the ballet barre 2 the ballet barre 2 has a hole defined therein to securely receive the angled portion 6e" of the support arm 6 so that the ballet barre 2 becomes fixedly attached to the arm 6e.

Figure 3:
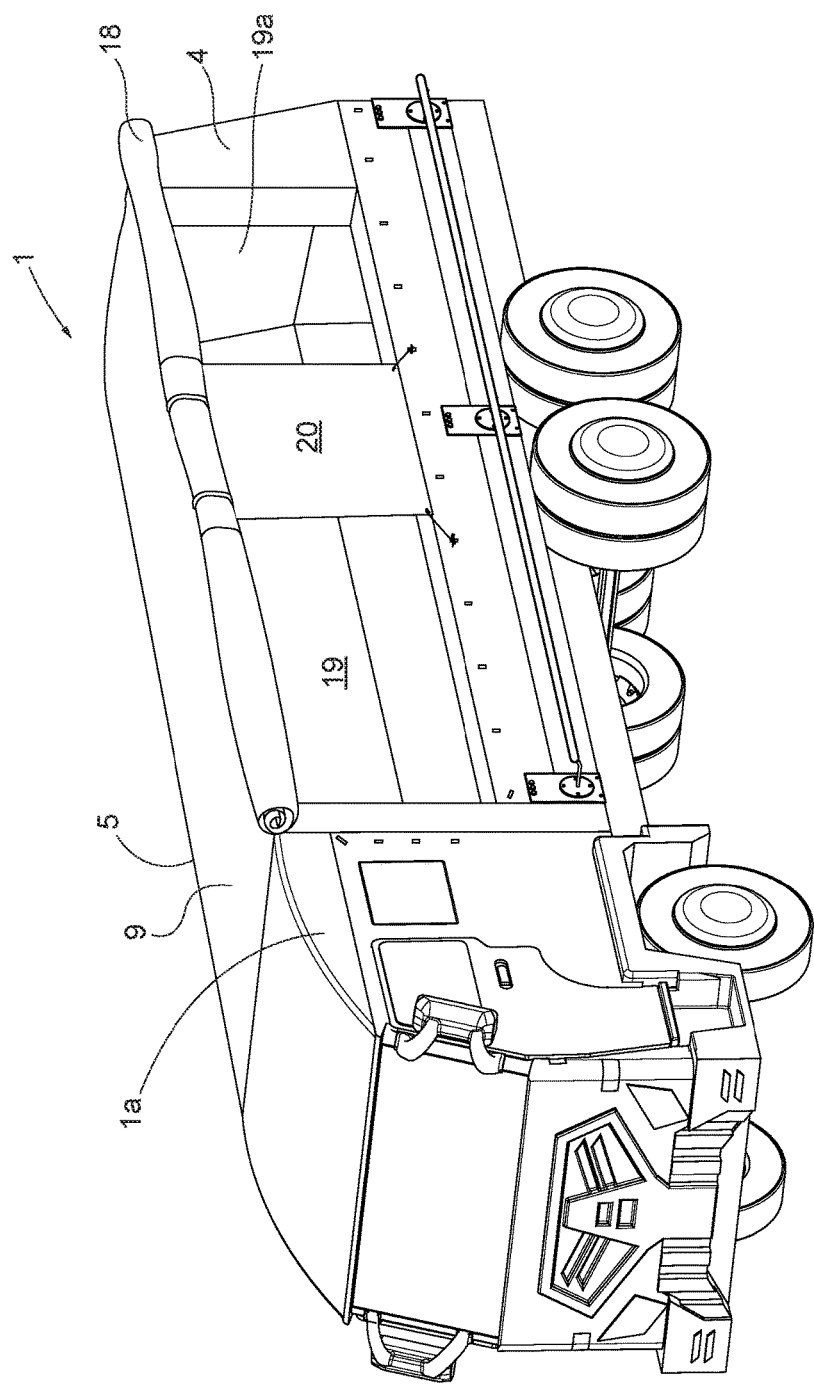
FIG. 3 shows the vehicle of FIG. 1 with windows on both sides of the vehicle being open.

The vehicle 1 may have windows 17 in the sides of the vehicle 1 that may be configured to be closed (FIG. 1) or opened (FIG. 3). The windows 17 may be made of flexible material, such as clear plastic, and may be integrated into a larger flexible fabric panel 18 that frames the windows 17. As shown in FIG. 1, the entire flexible panel 18 may be attached to the side 4 of the vehicle 1 with rope or cable 18a. Also, as shown in FIG. 3, the entire flexible panel 18 may be rolled up toward the roof 9 of the vehicle 1 to uncover an opening 19a in a passenger cabin 19 of the vehicle 1. Sun shades 20 inside the cabin 19 may be lowered to partially close the interior of the cabin 19. It will be appreciated that when the windows 17 are rolled up on both sides 4 and 5 of the vehicle 1, a visual and audible pathway is established across the openings 19a in the cabin 19 so that users of ballet barres 2 on both sides 4 and 5 of the vehicle 1 can see and/or hear each other and an instructor that may be giving instructions from inside the passenger cabin 19.

The vehicle 1 may include a retractable canopy (not shown) coupled to each side 4 and 5 of the vehicle to provide shade for users of the barre 2. Such canopies are configured to extend laterally from the side of the vehicle 1 when users are using the barres 2 and to retract compactly against the vehicle to be stowed for storage when users are not using the barres 2 and while the vehicle 1 is in motion.

Also, the vehicle 1 may include one or more mirrors (not shown) attached to the sides 4 and 5 of the vehicle 1 below the openings 19a so that users that are using the barre 2 can see their form. The mirrors may be covered during transport of the vehicle 1. Also, the mirrors may be configured so that the mirrored surface faces the vehicle during transport and are reconfigurable to face outward when users are using the barre 2. It will be appreciated that various types of fasteners or magnetic means may be used to mount the mirrors in stowed and in-use configurations.

The vehicle 1 may be used as a mobile barre work studio. For example, one or more users may wish to take an exercise class at a remote location, such as at a beach or a park. Users may board the vehicle at a first location and enter the passenger cabin 19 of the vehicle 1. An instructor or another person may then drive the vehicle 1 onto the beach and park the vehicle 1 on the beach or park. Alternatively, users may travel independently (i.e., in their own vehicles) and meet the vehicle 1 at the beach or park. When users are at the workout location, any users in the cabin 19 get out of the vehicle 1 and meet any other users independently joining them to get ready for barre work. Preferably, before the instructor begins barre work instruction, the windows 17 and panels 18 of the vehicle 1 are rolled up, as shown in FIG. 3, for example, so that participants on both sides 4 and 5 of the vehicle 1 can see/hear each other and/or the instructor who may be inside the passenger cabin 19 of the vehicle 1. Also, the aforementioned canopy may be extended from the sides 4 and 5 of the vehicle 1. In addition to barre work, mats, weights, and other props may be laid on the ground for users to use for exercising. The instructor may perform instruction while moving between the mats (similar to center floor concept in ballet) on the ground while wearing a microphone (not shown) communicatively coupled (via wires or wirelessly) to speakers (not shown) coupled to the vehicle 1, and may be located on either or both sides 4 and 5 of the vehicle 1. Also, an audio system (not shown) may be located in or on the vehicle 1 and may be communicatively coupled (via wires or wirelessly) to the speakers for outputting music. Participants perform their barre work and other exercises at the remote location using the ballet barres 2 on the sides 4 and 5 of the vehicle 1 and the mats, weights, and other props. While performing their barre work and other exercises, the users may listen to instructions and/or music output from the speakers. When barre work and/or other exercises are finished, the participants may then depart from the remote location either via the vehicle 1 or independently using their own transportation.

Typically, in an indoor barre studio, a ballet barre is positioned at a certain height relative to the floor of the studio that a user is standing on. For example, a typical ballet barre height between the ballet barre and the surface the user is standing on is about 36 inches. However, owing various environmental factors outdoors, the barre height of the ballet barre 2 relative to the surface a user is standing on may vary. For example, when the vehicle 1 drives onto loose sand at the beach, as discussed in the example above, it is possible that the vehicle 1 may sink slightly into the ground to a ground-engaging plane 8 of the tires 10 such that the distance between the ballet barre 2 and the ground will be less than when the vehicle 1 is sitting on solid ground, such as concrete or asphalt pavement. Moreover, when a user stands next to the ballet barre 2 on loose ground, such as sand at the beach, their feet may also sink below the surface of the ground to a level that is different from the ground-engaging plane 8 of the tires 10, contributing yet more variation in barre height. Also, to drive on sand or loose soil, the tires 10 of the vehicle 1 may be deflated slightly (in comparison to their inflated volume when the vehicle is driving on pavement), further reducing the vertical distance between the ballet barre 2 and the ground. Therefore, in view of the aforementioned factors, the position of the ballet barre 2, which is fixed by bracket 6, relative to the surface upon which a user stands for barre work, may not be desirable for users, especially where the users are accustomed to a typical barre height in an indoor barre studio environment.

Figure 4:
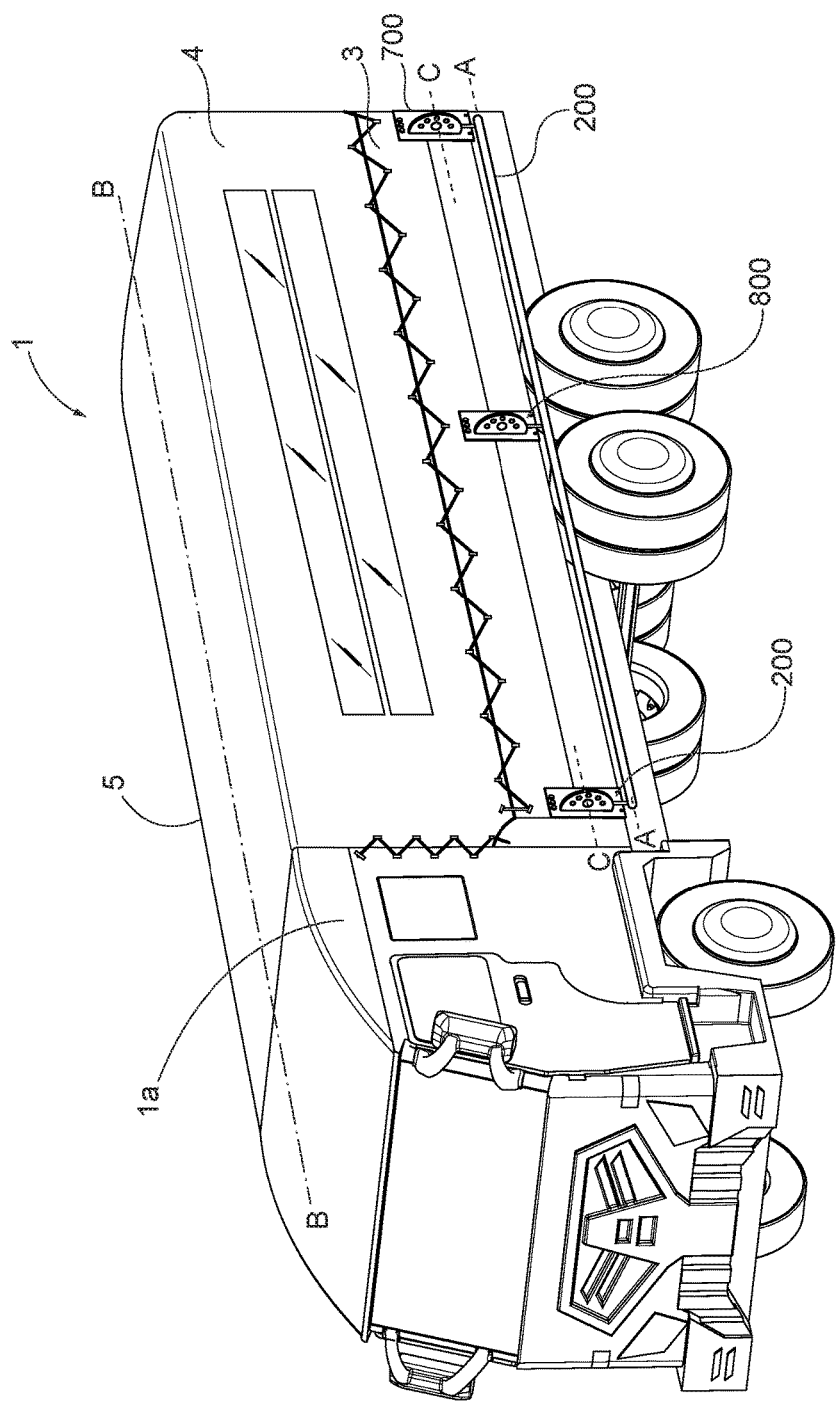
FIG. 4 is a view of another embodiment of a vehicle that includes a stowable ballet barre, with the ballet barre shown in a lower stowed position.
Figure 5:
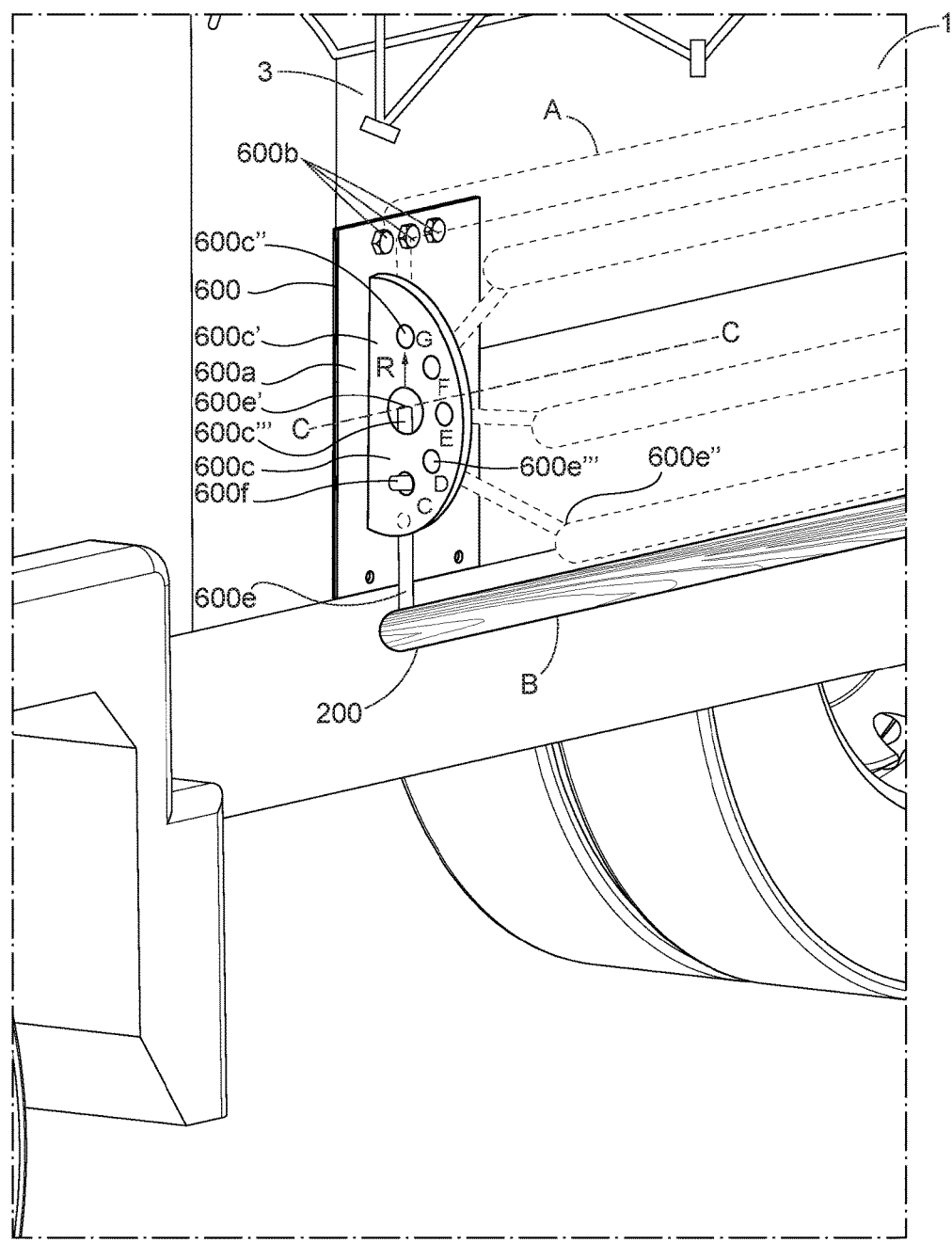
FIG. 5 shows a portion of the vehicle of FIG. 4 with the ballet barre in various deployed positions between an upper stowed position and a lower stowed position.

In an alternate embodiment shown in FIGS. 4 and 5, the vehicle 1 is equipped with a selectively positionable ballet barre 200, which can be selectively pivoted or rotated about a longitudinal axis C-C parallel to the longitudinal axis A-A of the ballet barre 200. This configuration provides for adjustability of the height of the ballet barre 2 relative to the ground-engaging plane 8 of the tires 10 of the vehicle 1 as well as adjustability of the lateral position of the ballet barre 2 relative to the elongate sides 4 and 5 of the vehicle 1 to which the ballet barre 2 is mounted for compact stowing as described below. To permit such selective positioning, the ballet barre 200 is mounted to the frame 3 of the vehicle 1 by a front bracket 600, a rear bracket 700, and an intermediate bracket 800 between the front and rear brackets 600 and 700, which differ from fixed brackets 6, 7, and 22 in FIGS. 1 to 3, and which are similar to brackets available from Vita Vibe, Inc. of Greenville, S.C. Specifically, instead of the fixed arm 6e of bracket 6, bracket 600 has a movable arm 600e that is permitted to selectively pivot about axis C-C to move ballet barre 200 in an arc shown in FIG. 5, as described in further detail below.

The front, rear, and intermediate brackets 600, 700, and 800 are identical, such that only a detailed description of bracket 600 is provided below. In the embodiment shown in FIGS. 4 and 5, the bracket 600 is pivotable in a range of about 180 degrees between an upper stowed position G and a lower stowed position C. Each stowed position corresponds to one of holes 600c″ formed in the plate 600c, described in greater detail below. Preferably, before the vehicle 1 is driven, the ballet barre 200 is placed into either of the upper or lower stowed positions G, C to reduce the chances of the ballet barre 200 coming into contact with objects close to the sides 4 and 5 of the vehicle 1. Between the upper and lower stowed positions G, C, the ballet barre 200 may be selectively positioned in one of a plurality of deployed positions (D, E, F), as shown in FIG. 5. Each deployed position D-F corresponds to one of the holes 600c″ formed in the plate 600c. FIG. 5 shows the vehicle of FIG. 4 with the ballet barre 200 in a lower stowed position C in solid lines and in the other positions D-G in broken lines.

In use, when the vehicle 1 is stopped at an instructional location, such as the beach in the example above, the stowed ballet barres 200 can be rotated from their stowed positions G or C and set to respective deployed positions D-F, where the heights of the ballet barres 200 are suitable for users of the ballet barres 200. Once the ballet barres 200 are at their desired deployed positions D-F, the users may begin their barre work. At the completion of ballet barre work, and before the vehicle travels again, the ballet barres 200 are returned to one of the stowed positions G or C.

FIG. 5 shows an exploded view of front bracket 600. The front bracket 600 includes a rectangular plate 600a that is mounted to the frame 3 with fasteners 600b, such as bolts, although other connection means may be used, such as welding. The front bracket 6 also includes a semicircular plate 600c that is coupled to the rectangular plate 600a below the fasteners 600b and the frame 3. The semicircular plate 600c has a linear edge 600c' that is connected to the rectangular plate 600a so that the semicircular plate 600c extends at a right angle with respect to the rectangular plate 600a. The semicircular plate 600c may be coupled to the plate 600a with fasteners (not shown), such as bolts or rivets, although other connection means may be used, such as welding. The semicircular plate 600c has a plurality of through-holes 600c" arranged in a spaced circumferential arrangement around a central hole 600e" through which the axis C-C extends. The holes 600c" are radially spaced equally a distance R from axis C-C. As noted above, each hole 600c" corresponds to one of the positions C-G. The holes 600c" are show as being spaced equally circumferentially, although such spacing may be unequal in another embodiment.

The front bracket 600 also includes the abovementioned support arm 600e, which is pivotally coupled to the semicircular plate 600c, such as by a pinned or riveted coupler. The support arm 600e has a first end 600e' that is pivotally connected to semicircular bracket 600c at hole 600c'''. The support arm 600e has a second end 600e" that is spaced from the first end 600e' and that is coupled to the ballet barre 200. Owing to the pivoting connection between the support arm 600e and the semicircular bracket 600c, the support arm 600e and the ballet barre 200 may be rotated about the axis C-C along an arc shown in FIG. 5 that intersects through holes 600c" and positions C-G.

The arm 600e may define a through hole 600e''' located between the first end 600e' and the second end 600e". The through hole 600e''' may be located a radial distance R from axis C-C so that the hole 600e''' can align with any of the holes 600c" when the arm 600e is rotated. When the hole 600e''' is aligned with one of the holes 600c" in the bracket 600c, a pin 600f or other retaining element may be inserted through the aligned holes to retain the ballet barre 200 at one of the positions C-G. In one embodiment, the pin 600f may be spring biased and otherwise coupled to one or another of the arm 600e or the bracket 600c for biased engagement through hole 600e''' and holes 600c". For example, the pin 600f may be biased with a spring so that a user may pull the pin 600f out of mating engagement with the hole 600e''' and respective hole 600c" to permit the arm 600e to move relative to the plate 600c to a desired one of the positions C-G. Once the arm 600e is rotated to a desired position and the hole 600e''' is aligned with a corresponding hole 600c" located at the position, the user may release the pin 600f so that the spring biased pin 600f inserts itself through holes 600e' and the other respective hole 600c", thus locking the arm 600e in a new angular position.

There have been described and illustrated herein several embodiments of a vehicle. While particular embodiments of the invention have been described, it is not intended that the invention be limited thereto, as it is intended that the invention be as broad in scope as the art will allow and that the specification be read likewise. Thus, while particular barre mounting structures and vehicles have been disclosed, it will be appreciated that other barre mounting structures and vehicles may be used as well. It will therefore be appreciated by those skilled in the art that yet other modifications could be made to the provided invention without deviating from its spirit and scope as claimed.

What is claimed is:

1. A mobile ballet barre work studio comprising:
   a motor vehicle having opposed elongate sides with corresponding elongate ballet barres mounted thereto one of the elongate sides of the vehicle, wherein each ballet barre extends along a horizontal first axis that is parallel to and vertically offset from the ground-engaging plane of the tires of the vehicle and wherein each ballet barre extends parallel to the corresponding side of the vehicle to which it is mounted,
   wherein the motor vehicle includes an enclosed passenger cabin between the elongate sides of the vehicle and between the ballet barres, the passenger cabin configurable between an enclosed configuration and an open configuration, the passenger cabin configured to receive one or more passengers for transport in the vehicle to or from a barre workout location, and
   wherein in the open configuration the passenger cabin permits at least one of audible and visual communication across the passenger cabin from one vehicle side to the other vehicle side,
   wherein the motor vehicle is configurable between a transport mode and a studio mode, wherein in the transport mode the passenger cabin is configured to transport the one or more passengers when the motor vehicle is moving to or from the barre workout location, and in the studio mode the motor vehicle is stationary and the passenger cabin is configured for audible and visual communication across the passenger cabin for passengers performing barre work using the barres.

2. The apparatus according to claim 1, wherein:
   the ballet barre is spaced from the side of the vehicle.

3. The apparatus according to claim 1, further comprising:
   a bracket coupling the ballet barre to the frame of the vehicle, the bracket configured to space the ballet barre from the side of the vehicle.

4. The apparatus according to claim 3, wherein:
   the bracket is pivotable about a second axis extending parallel to the first axis and spaced therefrom, the bracket being pivotable between at least one stowed position and at least one deployed positions, wherein in the stowed positions the ballet barre is disposed closer to the side of the vehicle than in any of the deployed positions.

5. The apparatus according to claim 4, wherein:
   the bracket is configured to deploy the ballet barre at a vertical position of about 30 to 36 inches from the ground-engaging plane of the tires.

6. The apparatus according to claim 4, wherein:
   the bracket has an arm attached to the ballet barre, wherein the arm is configured to rotate at least 180 degrees about the second axis.

7. The apparatus according to claim 4, wherein:
   when the bracket is in the stowed position, the ballet barre is substantially adjacent to the side of the vehicle to which it is mounted.

8. The apparatus according to claim 1, wherein:
   the ballet barre has a length and extends from a rear end of the vehicle to at least one of a front end of the passenger cabin and a driver's cab of the vehicle.

9. The apparatus according to claim 1, wherein:
   the length of the ballet bar is at least 8 feet.

10. The apparatus according to claim 1, wherein:
a first opening is defined in a first elongated side of the vehicle and a second opening is formed in a second elongated side of the vehicle, wherein the first and second openings permit visual and audible communication therebetween.

11. The apparatus according to claim 10, wherein:
the vehicle includes a first panel on the first side and a second panel on the second side, the first and second panels configured to selectively cover or uncover, respectively, the first opening and the second opening.

12. The apparatus according to claim 11, wherein:
at least one of the first panel and the second panel includes at least one window.

13. The apparatus according to claim 11, wherein:
the first and second panels include flexible material to permit the panels to be rolled up and down for opening and closing of the first and second openings.

14. A method of using a mobile ballet barre work studio, the method comprising:
providing a mobile ballet barre work studio including:
a motor vehicle having opposed elongate sides with corresponding elongate ballet barres mounted thereto one of the elongate sides of the vehicle, wherein each ballet barre extends along a horizontal axis that is parallel to and vertically offset from the ground-engaging plane of the tires of the vehicle and wherein each ballet barre extends parallel to the corresponding side of the vehicle to which it is mounted,
wherein the motor vehicle includes an enclosed passenger cabin between the elongate sides of the vehicle and between the ballet barres, the passenger cabin configurable between an enclosed configuration and an open configuration, the passenger cabin configured to receive one or more passengers for transport in the vehicle to or from a barre workout location, and
wherein in the open configuration the passenger cabin permits at least one of audible and visual communication across the passenger cabin from one vehicle side to the other vehicle side;
transporting the vehicle to a ballet barre workout location and configuring the mobile barre work studio for barre work; and
when the mobile barre work studio is configured for barre work, performing barre work using one or the other of the elongated ballet barres.

15. The method according to claim 14, wherein:
transporting includes transporting at least one of an instructor and a plurality of ballet barre users in the vehicle to the barre workout location, wherein the plurality of ballet barre users are transported in the passenger cabin.

16. The method according to claim 15, wherein:
the mobile ballet barre apparatus includes a bracket coupling the ballet barre to the elongated side of the vehicle, the bracket configured to space the ballet barre from the side of the vehicle, and the bracket is pivotable between a stowed position and at least one deployed position, and
wherein transporting includes moving the vehicle with the ballet barre in the stowed position.

17. The method according to claim 16, further comprising:
positioning the ballet barre into a deployed position when the vehicle is located at the barre workout location.

18. The method according to claim 14, further comprising:
opening at least one window in each of the elongated sides of the vehicle when the vehicle is located at the barre workout location.

19. The apparatus according to claim 1, wherein:
the motor vehicle is an all-terrain vehicle.

* * * * *